United States Patent [19]

Hakamatsuka et al.

[11] Patent Number: 5,013,363

[45] Date of Patent: May 7, 1991

[54] MOLD FOR THE CASTING OF GLASS CERAMIC

[75] Inventors: Yasuharu Hakamatsuka; Kazuhiro Watanabe, both of Hachioji, Japan

[73] Assignee: Olympus Optical Co., Ltd., Tokyo, Japan

[21] Appl. No.: 471,840

[22] Filed: Jan. 29, 1990

[30] Foreign Application Priority Data

Feb. 6, 1989 [JP] Japan ................................ 1-27155

[51] Int. Cl.⁵ .............................................. B28B 7/34
[52] U.S. Cl. ................................ 106/38.3; 106/38.9; 501/111; 501/133; 433/48
[58] Field of Search ................ 106/38.3, 38.9; 501/111, 133; 433/48

[56] References Cited

U.S. PATENT DOCUMENTS

| | | | |
|---|---|---|---|
| 2,466,138 | 4/1949 | Wainer | 501/111 X |
| 2,675,322 | 4/1954 | Watts | 501/111 X |
| 4,262,055 | 4/1981 | Russell et al. | 501/111 X |
| 4,417,925 | 11/1983 | Cherry | 501/111 X |
| 4,591,385 | 5/1986 | Pearsall | 106/38.3 |
| 4,709,741 | 12/1987 | Nakamura | 106/38.3 X |
| 4,830,083 | 5/1989 | Nakamura | 106/38.3 X |

FOREIGN PATENT DOCUMENTS 57-9554   1/1982 Japan.
57-72749  5/1982 Japan.

Primary Examiner—Karl Group
Attorney, Agent, or Firm—Frishauf, Holtz, Goodman & Woodward

[57] ABSTRACT

The phosphate mold material of this invention comprises refractory materials and binders as principal components, the refractory materials containing cristobalite and quartz, and the binders containing metal oxides which includes magnesia clinker and a phosphate salt. The proportion of said refractory materials to said binders is 80:20–90:10, and the proportion of cristobalite to quartz is in the range 6:1–7:1.

11 Claims, No Drawings

MOLD FOR THE CASTING OF GLASS CERAMIC

BACKGROUND OF THE INVENTION

1. Field of the Invention

This invention concerns phosphate mold materials suitable for the casting of glass ceramics with a melting point of 1000° C. or more.

2. Description of the Related Art

Since phosphate mold materials have excellent heat resistance to gypsum mold materials, they are used for base metal alloys, such as Ni-Cr and Co-Cr, which have high melting points. Their usefulness as mold materials is particularly appreciated in the field of dental casting using base metal alloys.

Phosphate mold materials comprise mainly silica (consisting of cristobalite and quartz with different crystal systems), which functions as a refractory material, and phosphates and metal oxides, which function as binders. The phosphate used as a binder may be an acid phosphate, such as primary ammonium phosphate or primary magnesium phosphate. The metal oxide used as a binder may be magnesium oxide, and in particular hard-baked or electromelted magnesia, which has a periclase crystal structure.

The composition of conventional phosphate mold materials is 80–90 weight % of refractories, 10–20 weight % of binders, and minute amounts of other components, which are added to control hardening time, or to adjust gas permeability and to improve storage stability.

Mold materials with these compositions are ground together with 5–20% colloidal silica solutions in order to prepare a mold. After the cast is poured into the mold, the mold is then shattered and the cast is removed.

With alloys having high melting points, however, about 2.0–2.3% shrinkage occurs in the cooling process after pouring, and it is necessary to compensate for this shrinkage if a high precision cast is to be manufactured.

A mold material which permits control the expansion coefficient is disclosed in Unexamined Published Japanese Patent No. 57-9554. The mold material in this disclosure consists of quartz 65 weight %, cristobalite 20 weight %, magnesium oxide 5.6 weight % and primary ammonium phosphate 9.4 weight %, and carboxylic acids are also added.

Conventional mold materials however have a compressive strength of 76–185 Kg/cm$^2$, and they are thus very hard. If it was attempted to remove a cast of a brittle material, such as glass from the mold, therefore, there was a strong possibility that the cast would also break when the mold was shattered, and removal was therefore difficult.

If the amount of cristobalite in the mold material is increased, the overall expansion can be compensated, but cracks then occur more easily in the mold due to thermal shock.

SUMMARY OF THE INVENTION

A first object of this invention is to provide a phosphate mold material which permits the dimensions of the produce cast to be controlled with high precision.

A second object of this invention is to provide a phosphate mold material from which a mold can be made that permits the cast to be removed very easily.

The principal components of the phosphate mold material of this invention are refractory materials and binders. The refractory materials contain cristobalite and quartz, while the binders contain metal oxides including magnesia clinker, and a phosphate. The weight ratio of said refractory materials to said binders is 80:20–90:10, while the weight ratio cristobalite to quartz is 6:1–7:1.

According to this invention, the binders of the phosphate mold material contains magnesia clinker, therefore in comparison to conventional mold materials, which do not contain magnesia clinker, the compressive strength can be very much reduced, and even casts of brittle materials, such as glass can be easily removed from the mold without damage. Further, the proportion of cristobalite has been made greater than that of quartz so that overall expansion can be compensated and a high precision can be manufactured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

The principal components of the phosphate mold material of this invention are refractory materials containing cristobalite and quartz, and binders consisting of metal oxides containing magnesia clinker, and a phosphate salt. The proportion of refractory materials to binders is 80:20–90:10, while the proportion of cristobalite to quartz is 6:1–7:1. Further, the binders contain 4.0–5.0 weight % of magnesia clinker, 9.5–10.0 weight % of ammonium dihydrogen phospate and 0.5–1.0 weight % of hard-baked magnesia. Further, the cristobalite in the refractory materials consists of two kinds of cristobalite, that is, cristobalite with a particle size 100 $\mu$m at most, and cristobalite with a particle size at least 500 $\mu$m.

This phosphate material contains cristobalite and quartz in the proportion of 6:1–7:1. This causes the heating expansion coefficient to vary by 1.4%–1.8%, and so compensate for the overall expansion. It is thus possible to prevent loss of precision due to shrinkage of the cast.

Further, as the binders contain the above proportions of components, expansion due to solidification varies from 0.35–0.8%, overall expansion is compensated, and a high precision cast can be manufactured.

Further, as the refractory material contains 2 kinds of cristobalite with different particle distributions, cracks due to thermal shocks can be effectively prevented, and the expansion coefficient can be increased.

EXAMPLE 1

The phosphate mold material of this invention contains refractory materials consisting principally of cristobalite A, cristobalite B and quartz, and binders consisting principally of magnesia clinker, ammonium dihydrogen phosphate (or primary ammonium phosphate) and hard-baked magnesia, in the proportions shown in Table 1. The particle distributions of cristobalite A and cristobalite B are different; cristobalite A has a particle size of no more than 50 $\mu$m, while cristobalite B has a particle size of no less than 840 $\mu$m. Further, the magnesia clinker consists principally of MgO together with minute quantities of other components, such as CaO, $SiO_2$ and $SO_2$.

TABLE 1

|  | Component | Weight % |
|---|---|---|
| Refractory materials | Cristobalite A | 51.0 |
|  | Cristobalite B | 20.0 |
|  | Quartz | 14.0 |
| Binders | Magnesia clinker | 4.6 |
|  | Ammonium dihydrogen phosphate | 9.8 |
|  | Hard-baked magnesia | 0.6 |

To study the properties of the phosphate mold material of this example and having such a composition, we carried out measurements of the expansion produced on solidification, the temperature reached when heat is evolved during solidification, its thermal expansion, and its compressive strength. Compressive strength, moreover, is a measure of the ease with which a cast can be removed from the mold.

First, the phosphate mold material was ground under vacuum with colloidal silica solutions of three different concentrations, 5%, 10% and 15%, and the mixture poured into formworks of different shapes, depending on the measurement to be made, to prepare samples for measuring compressive strength, expansion on solidification, temperature reached when heat is evolved during solidification, and thermal expansion. The proportions of colloidal silica solution and phosphate mold material were 26 ml of the silica solution per 100 g of phosphate mold material. Further, the formworks used to prepare samples for measurement of compressive strength, expansion on solidification and temperature reached when heat is evolved during solidification, were of vinyl chloride with a diameter of 30 mm and a length of 60 mm. The formwork used to prepare a sample for thermal expansion had a diameter of 5 mm and a length of about 15–16 mm.

Table 2 shows the results of the measurements carried out on the above samples. Table 2 also gives the properties of conventional phosphate mold materials.

TABLE 2

| Concentration of collodial silica | Expansion on solidi- tication (%) | Temperature reached due to heat evolved during solidfi- cation (°C.) | Thermal expansion (%) | Overall expansion (%) | Compressive strength (kg/cm²) |
|---|---|---|---|---|---|
| 5% | 0.32 | 27.0 | 1.21 | 1.53 | 34 ± 4 |
| 10% | 0.28 | 27.4 | 1.21 | 1.52 | 38 ± 5 |
| 15% | 0.25 | 27.2 | 1.42 | 1.67 | 42 ± 3 |
| Conventional material | 0.67 | 46.0 | 1.61 | 2.28 | 76 ± 5 |

To measure thermal expansion, a sample was first prepared by pouring into the appropriate formwork. After solidification, the sample was left at room temperature for 1 day and night. Its temperature was raised to 300° C. for 1 hour, and maintained in the same condition for 30 minutes. Its thermal expansion on heating to 600° C. was then measured.

As shown in Table 2, the phosphate mold material of the above composition has a far lower compressive strength than conventional mold materials. Even in the case of casts such as glass, therefore, the mold can easily be shattered, and the cast easily removed without breaking. Further, as the heat evolved during solidification is small, a high precision cast can be molded without softening a wax pattern. This phosphate mold material is thus very useful when, for example, casting glass ceramic teeth crowns.

EXAMPLE 2

The phosphate mold material of this example contains cristobalite A, cristobalite B, quartz, magnesia clinker, ammonium dihydrogen phosphate and heavy magnesia in the proportions shown in Table 3.

TABLE 3

|  | Component | Weight % |
|---|---|---|
| Refractory materials | Cristobalite A | 51.0 |
|  | Cristobalite B | 20.0 |
|  | Quartz | 14.0 |
| Binders | Magnesia clinker | 4.4 |
|  | Ammonium dihydrogen phosphate | 9.8 |
|  | Hard-baked magnesia | 0.8 |

To examine the properties of this phosphate mold material samples were prepared as in Example 1 for measurement of compressive strength, expansion on solidification, temperature reached when heat is evolved during solidification, and thermal expansion. In this example, 2 types of sample were prepared by grinding the mold material with colloidal silica solutions of 10% and 15% concentration respectively. Table 4 shows the results of various tests carried out on these samples.

TABLE 4

| Concentration of collodial silica | Expansion on solidi- tication (%) | Temperature reached due to heat evolved during solidfi- cation (°C.) | Thermal expansion (%) | Overall expansion (%) | Compressive strength (kg/cm²) |
|---|---|---|---|---|---|
| 10% | 0.89 | 37.5 | 1.50 | 2.39 | 48 ± 4 |
| 15% | 0.76 | 36.9 | 1.39 | 2.15 | 50 ± 5 |
| Conventional material | 0.67 | 46.0 | 1.61 | 2.28 | 76 ± 5 |

As seen from Table 4, using the phosphate mold material with the above composition, the compressive strength is much lower than that obtained using the conventional material and similar results are obtained to those in Example 1. Further, it is seen that by changing the proportion of hard-baked magnesia, the overall expansion changes. By making slight changes to the proportion of heavy magnesia, therefore, sufficient overall expansion may be obtained to compensate for the shrinking of the cast in the same way as by increasing the proportion of cristobalite.

We shall next describe an example using the mold material of Example 1. A mold was prepared using the mold material shown in Example 1, and a glass cast was prepared using this mold. First, 10% colloidal silica solution was added to 100 g of the phosphate mold material of Example 1, and the mixture was vacuum ground to prepare a slurry. Next, a wax pattern prepared using a conical master die was run into said slurry and incinerated to manufacture a mold. After heating this mold to 600° C., glass was poured into the mold to make a glass cast. It was found that the glass cast could be removed easily from the mold without breaking it. When the dimensions of the glass cast were examined by a 3-dimensional measuring instrument, it was found that the cast was bigger than the master mold by only 60±5 mm.

The above test results showed that the mold material of this invention can be applied to the casting of a glass ceramic of a tooth crown.

As shown by the above Examples 1 and 2, therefore, the binders of the phosphate mold material of this invention contain magnesia clinker, and it thus has a far lower compressive strength than conventional mold materials. For this reason, even casts of brittle materials, such as glass, can easily be removed from the mold without breaking. Further, as the proportion of cristobalite is greater than that of quartz, the overall expansion can be compensated, and a high precision cast can be obtained. Further, as the cristobalite used as a refractory material in the phosphate composition consists of 2 types with different particle size distributions, the expansion coefficient can be increased without causing cracks, even if the proportion of cristobalite in the composition is greater than that of quartz, and a cast with high dimensional precision may thus be manufactured.

The above invention is not, however, limited to the above examples, it being possible, for example, to use primary magnesium phospates or another phospates as the phosphate, and electromelted magnesia or another oxide as the metal oxide.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A mold for the casting of glass ceramics, said mold being made of a phosphate system mold material consisting essentially of refractory materials containing cristobalite and quartz; and binders containing metal oxides and a phosphate, wherein the weight ratio of said refractory materials to said binders is 80:20 to 90:10, said metal oxides contained in said binders consisting essentially of magnesia clinker and hard-baked magnesia and said phosphate is aluminum dihydrogen phosphate.

2. The mold according to claim 1, wherein said cristobalite and said quartz in said refractory material is in a weight ratio of 6:1-7:1.

3. The mold according to claim 1, wherein said cristobalite consists essentially of 2 types of cristobalite having different particle size distributions.

4. The mold according to claim 3, wherein said 2 types of cristobalite contain 1 type of cristobalite having a particle size of 100 $\mu$m at most, and 1 type of cristobalite having a particle size of at least 500 $\mu$m.

5. The mold according to claim 1, wherein said phosphate system mold material contains, as said metal oxide, 4.0-5.0 weight % of magnesia clinker and 0.5-1.0 hard-baked magnesia and said material contains 9.5-10.0 weight % of ammonium dihydrogen phosphate.

6. The mold according to claim 1, wherein said mold has a compressive strength of 55 kg/cm$^2$ or less.

7. The mold according to claim 1, wherein said cristobalite comprises cristobalite A having a particle size of no more than 50 microns and cristobalite B having a particle size of no less than 840 microns.

8. The mold according to claim 1, wherein said magnesia clinker comprises MgO, CaO, SiO$_2$ and So$_2$.

9. The mold according to claim 7, wherein said refractory material comprises 51 weight % cristobalite A, 20 weight % cristobalite B and 14 weight % quartz and said binders comprise 4.6 weight % magnesia clinker, 9.8 weight % ammonium dihydrogen phosphate and 0.6 weight % hard-baked magnesia.

10. The mold according to claim 7, wherein said refractory material comprises 51 weight % cristobalite A, 20 weight % cristobalite B and 14 weight % quartz and wherein said binders comprise 4.4 weight % magnesia clinker, 9.8 weight % ammonium dihydrogen phosphate and 0.8 weight % hard-baked magnesia.

11. The mold according to claim 1 in combination with a glass ceramic therein.

* * * * *